Sept. 10, 1968      R. C. BIRKEBAK      3,401,263

APPARATUS AND METHOD OF MEASURING EMISSIVITY OF AN OBJECT

Filed April 15, 1965

INVENTOR.
RICHARD C. BIRKEBAK

BY Schroeder, Siegfried
& Ryan    ATTORNEYS

United States Patent Office 3,401,263
Patented Sept. 10, 1968

3,401,263
APPARATUS AND METHOD OF MEASURING
EMISSIVITY OF AN OBJECT
Richard C. Birkebak, 3144–D Briarcliff Road NE.,
Atlanta, Ga. 30329
Filed Apr. 15, 1965, Ser. No. 448,388
7 Claims. (Cl. 250—83.3)

ABSTRACT OF THE DISCLOSURE

The disclosure is directed to using an integrating sphere radiometer surrounded by thermal insulation means having a diffuse reflector surface with a constant and high reflectance value in the infrared with openings formed therein of equal area to admit radiations of a black body and a test sample emitting infrared energy having another opening formed therein to transmit radiations to a radiation sensitive detector. Means is also provided for adjusting the temperature level of the integrating sphere radiometer. Also a shutter may be used to form alternately a black body surface in place of the test sample.

---

This invention relates to the field of integrating sphere type radiometers and more particularly to an improved integrating sphere radiometer used for infrared detection, and the method of using the same to determine emissivity of a radiant source.

In the past the integrating sphere has been used for measurements in the visible radiation spectrum. Recent improvements and advances in technology have provided for measurement of infrared radiation with an integrating sphere through the use of improved surface coatings which have a reflectance in the infrared spectrum that are independent of wave length. Thus in my co-pending application Ser. No. 276,238 filed Apr. 29, 1963 and entitled Infrared Detector, now U.S. Patent No. 3,222,522 an improved integrating sphere radiometer is disclosed. The present invention is directed to an improvement in this integrating sphere radiometer and the method of using the same for determining spectral and total hemispherical emittance of a test sample which is sometimes referred to as the emissivity of the surface or the material. While the integrating sphere radiometer is suitable for detecting the presence of infrared radiation and the intensity of the same, it is not capable of isolating the factors necessary to determine hemispherical emittance. In the past this could only be obtained empirically from a number of complex and different types of measurements involving a plurality of apparatus. The present method and apparatus of determining the hemispherical emittance or emissivity of the surface is obtained through use of a modified integrating sphere radiometer in a simplified manner which is suitably accurate and rapid in measurement. The improved integrating sphere radiometer has included therewith a black body radiator in the sphere wall with provisions for controlling the temperature of the same to provide this improved method and apparatus.

Therefore it is an object of this invention to provide an improved radiation detecting apparatus capable of measuring factors for determining emissivity of an object.

Another object of this invention is to provide an improved method of determining emissivity of an object.

A further object of this invention is to provide a radiant energy detecting apparatus using an integrating sphere with openings therein for irradiating the sphere from a test sample and a reference source so that emissivity of a test sample may be determined.

These and other objects of this invention will become apparent from a reading of the attached description together with the drawings wherein.

Figure 1:
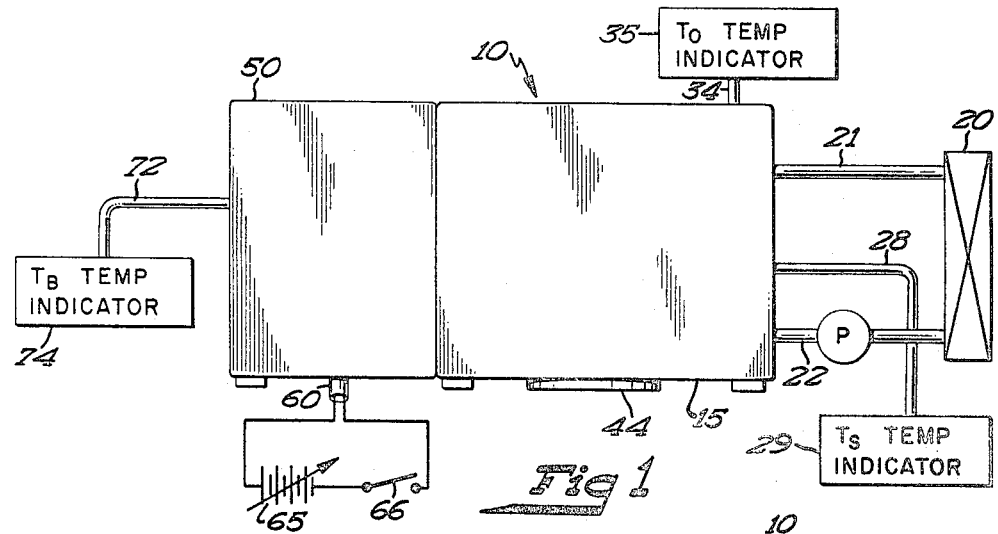
FIGURE 1 is an elevation view of a modified integrating sphere radiometer.

The schematic diagram of FIGURE 1 shows an integrating sphere radiometer incorporating the structural features of the sphere, its surface and the radiation sensing element as disclosed in my co-pending application Ser. No. 276,238 entitled Infrared Detector dated Apr. 29, 1963 now U.S. Patent No. 3,222,522. As disclosed in the before mentioned patent application, the optical roughness ratio when considering a diffuse reflector is in the order of .20 for operation in the infrared region. The diffuse reflector of the sphere may be formed by suitable means such as sand blasting, grinding, chemical etching or the like and the interior surface of the sphere may be coated with a layer of sulphur. The surface is roughened, and then is generally coated with highly reflecting materials such as gold, aluminum, platinum, etc.

Figure 2:
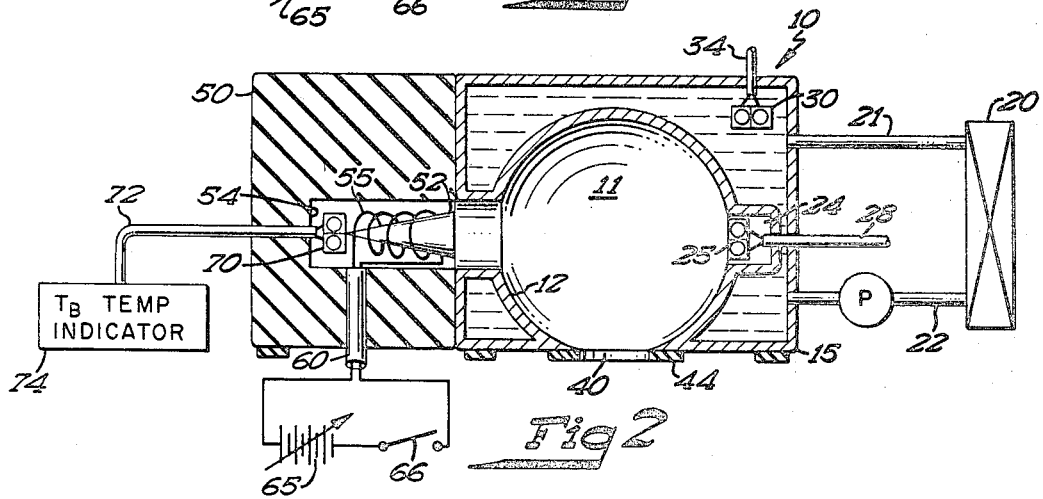
FIGURE 2 is an elevation view in section of the modified integrating sphere radiometer.

As will be seen schematically in FIGURE 2, the detecting apparatus as a whole is indicated generally at 10 with a spherical cavity 11 having the before mentioned surface as is indicated at 12. The sphere is formed within a thermal insulation housing 15 having a source of temperature controlling medium attached thereto, such as is indicated at 20, with pipes 21 and 22 leading into and out of the housing. Associated with the interior of the sphere is a side cavity 24 in which is positioned a radiation sensor 25 which sensor may be in the form of a thermopile or semiconductor type detector. Electrical cabling 28 leading to a temperature indicator or energy indicator 29 connects the detector to the indicator. Similarly the housing 15 of the radiometer includes a temperature sensor 30 designed to sense ambient temperature of the housing surrounding the sphere so that the ambient temperature can be kept constant during the measurements. The sensor 30 is connected through cables 34 to an ambient temperature indicator 35 to indicate this temperature.

The integrating sphere radiometer includes an opening 40 therein coinciding with an opening 44 in the housing through which radiant energy is directed to indicate the diffuse reflector surface 12 of the sphere, the opening being situated such that none of the radiant energy being directed through the opening will be directed directly on the sensing device. Opening 44 in the housing may be exposed directly to an infrared source or may have a test sample positioned over the same such that measurements may be made thereon.

As will be seen in section in FIGURE 2, a thermal insulating block 50 is positioned adjacent the housing 15 of the detector. Block 50 mounts a black body 52 which is positioned in a cavity 54 in the block with the black body having a heater element 55 surrounding the same. The element 55 is connected through electrical conductors 60 to a power source 65 and has a control element 66 in series therewith. The heater forms a heater for the black body to control the temperature of the same, and this temperature is measured through a temperature sensing element 70 positioned in the cavity adjacent the black body and leading through conductors 72 to a temperature indicator 74 to insure that a constant temperature of the body exists during the measurements.

The improved or modification of the integrating sphere radiometer with the addition of the black body radiator in the wall of the integrating sphere permits an improved method and structure for measuring spectral or total hemispherical emittance of the test radiant source or the test sample positioned at the opening 44. The opening or cavity 54 into the spherical cavity 11 is the same cross-sectional area of diametrical dimension as the opening 40 in the sphere and is directed into the sphere in such a manner as to irradiate the same from the black body. The spectral or total hemispherical emittance of the test sample or source is sometimes referred to as emissivity of the surface or the material for the test sample. In the present method of determining emissivity of the test sample, bihemispherical reflectance of the test sample is first determined. Thus from the energies measured, the bihemispherical reflectance is calculated and the hemispherical emittance is determined by the following formula:

$$E_h = 1 - P_{bh}$$

where $E_h$ is the hemispherical emittance and $P_{bh}$ is the bihemispherical reflectance.

For the purpose of simplifying the calculation of bihemispherical reflectance and the analysis of the same, the temperature of the black body 52, indicated as $T_b$, is made greater than the temperature of the test sample or radiant source, $T_s$, and this in turn is made greater than the temperature of the ambient sensor reference and the surroundings $T_o$. Thus:

$$T_b > T_s > T_o$$

The improved method of determining bihemispherical reflectance requires that the black body and the sample or source irradiate the interior of the sphere simultaneously with the temperature of the body for convenience being held at a level greater than that of the test sample. Under these conditions the sample itself will be irradiated by diffuse radiation from the black body at a temperature $T_b$. The energy sensed at the output or indicator 29 will be:

$$E_1 = kE_s + kP_{bh}B + mB$$

Where:
$k$ and $m$ are functions of the areas of the black body and sample openings,
$E_s$ is the energy emitted by the sample at temperature $T_s$, and
$B$ is the energy emitted by the black body at $T_b$.

After this measurement has been obtained, a second measurement is made with the sample replaced by the black body at a temperature $T_o$. Thus the sensor for the integrating sphere will measure only the energy emitted by the black body at temperature $T_b$ inasmuch as the irradiation from the black body of temperature $T_o$ at the opening 40 or sample opening will have no effect on the sensor held at the same temperature. The energy sensed by the sensor under these conditions is:

$$E_2 = mB$$

A third measurement is then made with the black body at temperature $T_b$ replaced or blocked off by a black body at a reference temperature $T_o$ and with the test sample or radiant source positioned in the opening 40 such that the sensor 25 senses only the energy emitted by the test sample. In this measurement, the heater source is disconnected through operation of the switch to disconnect the heater and the temperature of the body allowed to cool to a temperature $T_o$ as indicated by the temperature indicator 74. The insulating housing surrounding the black body permits the temperature controlling means 20 to maintain the ambient temperature of the sphere at temperature $T_o$ under conditions of both heater energization and de-energization. This latter measurement provides an energy:

$$E_3 = kE_s$$

The improved method now simply permits the calculation of bihemispherical reflectance by subtracting from $E_1$, the energy sensed in $E_2$ and $E_3$ and dividing this resolved energy by the energy $E_2$ in accordance with the formula:

$$\frac{E_1 - E_2 - E_3}{E_2} = \frac{k}{m} P_{bh}$$

In the improved integrating sphere radiometer, the area openings to the black body and the test sample, $k$ and $m$, are made equal. Thus:

$$k = m \text{ and } P_{bh} \text{ is determined as above}$$

With the factor of bihemispherical reflectance, the hemispherical emittance or emissivity of the test sample is then obtained by the formula:

$$E_h = 1 - P_{bh}$$

The use of the temperature controller in the housing surrounding the sphere permits the sphere and sensor reference to be held at the same temperature thereby eliminating the problem of energy transmitted therebetween.

Figure 3:
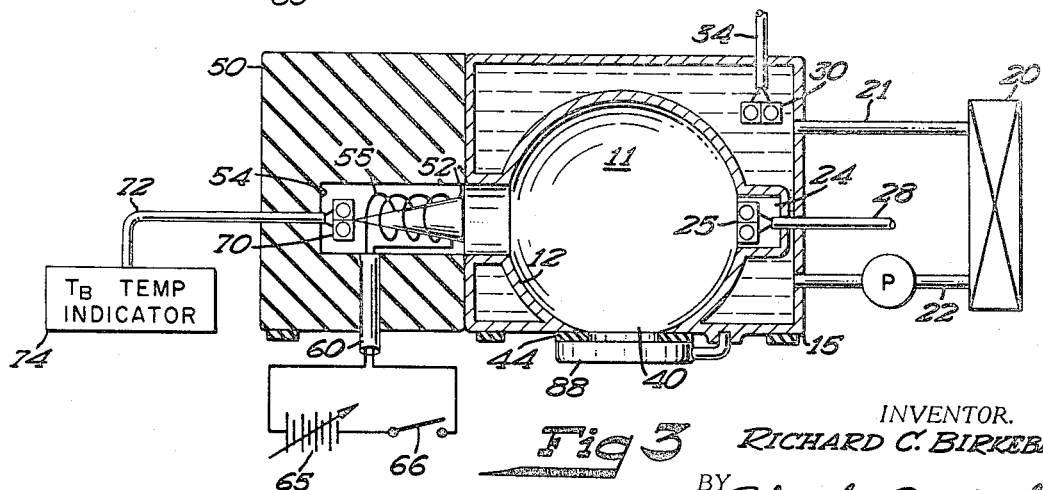
FIGURE 3 is a further modification of the improved integrating sphere radiometer in section.

In the modification of the integrating sphere radiometer shown in FIGURE 3, the basic elements disclosed and described in FIGURES 1 and 2 are incorporated. In addition, the opening 44 in the housing corresponding to and adjacent the opening 40 in the sphere has positioned in front of the same a shutter 88 pivotally mounted on the housing 15 and thermally associated therewith to be at the same temperature as the housing 15. The shutter provides the black body surface which can be moved in front of the opening 44 to cover the same and irradiate the sphere at the reference or ambient temperature $T_o$ for the purpose of measuring the effect of the reference body at temperature $T_b$ only. Thus the steps in the improved method are identical with that described above and the apparatus is simplified in that it enables the energy $E_2$ to be effected rapidly and without the addition of any external source other than the shutter 88 associated with the housing 15 and kept at the same temperature as the housing.

This improved mounting of the black body permits it to be moved out of the way of the test sample or radiant source introduced at the opening for the calculation of emissivity of the same.

In considering this invention it should be remembered that the present disclosure is intended to be illustrative only and the scope of the invention should be determined by the appended claims.

What is claimed is:

1. A radiation detecting apparatus comprising: an integrating sphere radiometer having a diffuse reflector surface with a constant and high reflectance value in the infrared for producing a substantially uniform radiation density within the sphere at any point on said diffuse reflector surface, said sphere having a plurality of openings therein, at least two of which are of equal area and adapted to face different sources of radiation, one of which is a test source; a reference source of radiant energy positioned adjacent another of said openings of equal area in said sphere; means included with the reference source of radiant energy for adjusting the temperature level of the same; thermal insulation means surrounding said integrating sphere radiometer and said reference source of radiant energy and having openings therein registering with said openings in the sphere of equal area; a cavity in said thermal insulation means registering with another of the openings in said integrating sphere; and a radiation sensitive means mounted in said cavity in said insulating means communicating with the openings in said sphere to receive uniform radiations from the sphere and produce a signal representative of said radiation.

2. The radiation detecting apparatus of claim 1 including means for replacing the test source of radiation with a source at the temperature level of the integrating sphere radiometer.

3. The radiation detecting apparatus of claim 1 in which the means for maintaining the reference radiant energy source at a predetermined temperature level is an adjustable heater.

4. The radiation detecting apparatus of claim 2 in which the means for replacing the test source of radiation is a movable means which closes the opening in the insulation and the integrating sphere with a reference source of radiation at the temperature level of the sphere.

5. The radiation detecting apparatus of claim 3 in which the cavity of the integrating sphere has a roughened diffuse reflector surface for producing a substantially uniform radiation density within the sphere where the roughened ratio of said surface is at least .2 and the sensing means senses infrared radiation.

6. The radiation detecting apparatus of claim 5 and including temperature sensors for sensing ambient temperature of the sphere and the temperature of the reference source.

7. The radiation detecting apparatus of claim 6 and including means for maintaining a constant ambient temperature of the sphere.

References Cited

UNITED STATES PATENTS

| | | | |
|---|---|---|---|
| 2,984,747 | 5/1961 | Walker | 250—83.3 |
| 3,131,308 | 4/1964 | Fredrickson et al. | 250—83.3 |
| 3,272,013 | 9/1966 | Astheimer | 73—355 |

ARCHIE R. BORCHELT, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,263                              September 10, 1968

Richard C. Birkebak

It is certified that error appears in the above identified patent and that said Letters Patent are hereby corrected as shown below:

In the heading to the printed specification, lines 4 and 5, "Richard C. Birkebak, 3144-D Briarcliff Road N. E., Atlanta, Ga. 30329" should read -- Richard C. Birkebak, 2024 Blairmore Road, Lexington, Ky. 40503 --. Column 5, line 5, "roughened" should read -- roughness --.

Signed and sealed this 10th day of February 1970.

(SEAL)
Attest:

Edward M. Fletcher, Jr.                      WILLIAM E. SCHUYLER, JR.
Attesting Officer                                 Commissioner of Patents